US012741333B2

United States Patent
(12) United States Patent
Yashima

(10) Patent No.: US 12,741,333 B2
(45) Date of Patent: Sep. 22, 2026

(54) CONTROL METHOD FOR PORTABLE WELDING ROBOT, WELDING CONTROL DEVICE, PORTABLE WELDING ROBOT, AND WELDING SYSTEM

(71) Applicant: Kobe Steel, Ltd., Kobe (JP)

(72) Inventor: Takashi Yashima, Kanagawa (JP)

(73) Assignee: Kobe Steel, Ltd., Kobe (JP)

( * ) Notice: Subject to any disclaimer, the term of this patent is extended or adjusted under 35 U.S.C. 154(b) by 951 days.

(21) Appl. No.: 18/001,966

(22) PCT Filed: May 12, 2021

(86) PCT No.: PCT/JP2021/018122
§ 371 (c)(1),
(2) Date: Dec. 15, 2022

(87) PCT Pub. No.: WO2021/256129
PCT Pub. Date: Dec. 23, 2021

(65) Prior Publication Data

US 2023/0234156 A1 Jul. 27, 2023

(30) Foreign Application Priority Data

Jun. 19, 2020 (JP) ................................ 2020-106327

(51) Int. Cl.
*B23K 9/127* (2006.01)
*B23K 9/095* (2006.01)
(Continued)

(52) U.S. Cl.
CPC ............ *B23K 9/127* (2013.01); *B23K 9/0953* (2013.01); *B23K 9/0956* (2013.01); *B23K 37/0211* (2013.01); *B25J 11/005* (2013.01)

(58) Field of Classification Search
CPC ........ B23K 9/127; B23K 9/173; B23K 9/028; B23K 9/0953; B23K 9/0956;
(Continued)

(56) References Cited

U.S. PATENT DOCUMENTS 5,579,983 A 12/1996 Mogi
6,177,650 B1 1/2001 Watanabe et al.
(Continued)

FOREIGN PATENT DOCUMENTS

JP 51-151647 A 12/1976
JP 52-133050 A 11/1977
(Continued)

OTHER PUBLICATIONS

Third Party's Submission issued Jan. 19, 2023 in Japanese Patent Application No. 2020-106327 (with partial English translation), 9 pages.

(Continued)

*Primary Examiner* — Brian W Jennison
(74) *Attorney, Agent, or Firm* — Oblon, McClelland, Maier & Neustadt, L.L.P.

(57) ABSTRACT

A method controls a portable welding robot to ensure good bead appearance even where a workpiece corner and a curved section of a guide rail are not located on a concentric circle and where there is a large difference in curvature between the workpiece corner and the curved section of the guide rail. A portable welding robot sets a guide rail with respect to a workpiece having a corner and performs arc welding on the workpiece while moving on the guide rail and a welding control device controls the portable welding robot. The control method includes determining a torch position on the workpiece via a torch position determination unit, calculating a torch angle at the torch position via a torch
(Continued)

angle calculation unit, and controlling the torch angle via a movable part based on the calculated torch angle.

11 Claims, 8 Drawing Sheets

(51) Int. Cl.
*B23K 37/02* (2006.01)
*B25J 11/00* (2006.01)

(58) Field of Classification Search
CPC ............ B23K 37/0217; B23K 37/0211; B23K 37/0264; B23K 37/0267; B23K 37/0282; B25J 9/0033; B25J 9/1664; B25J 11/005; B25J 13/08; B25J 19/02
See application file for complete search history.

(56) References Cited

U.S. PATENT DOCUMENTS

| | | | |
|---|---|---|---|
| 2005/0103766 A1 | 5/2005 | Iizuka et al. | |
| 2009/0107969 A1 | 4/2009 | Asai et al. | |
| 2011/0290765 A1* | 12/2011 | Albrecht ................. | B23K 9/00 219/78.01 |
| 2016/0325431 A1 | 11/2016 | Watanabe et al. | |
| 2017/0209950 A1 | 7/2017 | Nishimura et al. | |
| 2019/0240759 A1* | 8/2019 | Ennsbrunner ........ | B23K 9/0953 |
| 2021/0016386 A1* | 1/2021 | Yashima ................ | B23K 9/293 |
| 2021/0299773 A1 | 9/2021 | Matsuoka et al. | |

FOREIGN PATENT DOCUMENTS

| | | | |
|---|---|---|---|
| JP | 56-23397 | A | 3/1981 |
| JP | 58-188566 | A | 11/1983 |
| JP | 61-49775 | A | 3/1986 |
| JP | 61-150782 | A | 7/1986 |
| JP | 61-154770 | A | 7/1986 |
| JP | 2-92457 | A | 4/1990 |
| JP | 2-205266 | A | 8/1990 |
| JP | 3-114671 | A | 5/1991 |
| JP | 461749 | B2 | 10/1992 |
| JP | 5-69131 | A | 3/1993 |
| JP | 5-123866 | A | 5/1993 |
| JP | 5-265533 | A | 10/1993 |
| JP | 5-293646 | A | 11/1993 |
| JP | 5-329644 | A | 12/1993 |
| JP | 5-337645 | A | 12/1993 |
| JP | 6-79459 | A | 3/1994 |
| JP | 6-155027 | A | 6/1994 |
| JP | 6-285638 | A | 10/1994 |
| JP | 7-129217 | A | 5/1995 |
| JP | 7-266044 | A | 10/1995 |
| JP | 7-308780 | A | 11/1995 |
| JP | 8-52570 | A | 2/1996 |
| JP | 8-57781 | A | 3/1996 |
| JP | 8-103871 | A | 4/1996 |
| JP | 8-229676 | A | 9/1996 |
| JP | 9-10939 | A | 1/1997 |
| JP | 9-70664 | A | 3/1997 |
| JP | 9-182862 | A | 7/1997 |
| JP | 10-6005 | A | 1/1998 |
| JP | 10-24370 | A | 1/1998 |
| JP | 11-224119 | A | 8/1999 |
| JP | 11-277229 | A | 10/1999 |
| JP | 2000-79473 | A | 3/2000 |
| JP | 2000-246443 | A | 9/2000 |
| JP | 2001-162371 | A | 6/2001 |
| JP | 2001-287032 | A | 10/2001 |
| JP | 2002-144035 | A | 5/2002 |
| JP | 2003-53535 | A | 2/2003 |
| JP | 2003-285164 | A | 10/2003 |
| JP | 2003-326362 | A | 11/2003 |
| JP | 2004-74224 | A | 3/2004 |
| JP | 2004-268098 | A | 9/2004 |
| JP | 2007-307812 | A | 11/2007 |
| JP | 2008-279461 | A | 11/2008 |
| JP | 2009-6383 | A | 1/2009 |
| JP | 2009-34885 | A | 2/2009 |
| JP | 2009-131893 | A | 6/2009 |
| JP | 2010-214482 | A | 9/2010 |
| JP | 2011-235302 | A | 11/2011 |
| JP | 2011-240391 | A | 12/2011 |
| JP | 2012-106323 | A | 6/2012 |
| JP | 2013-180328 | A | 9/2013 |
| JP | 2015-123517 | A | 7/2015 |
| JP | 2015-174142 | A | 10/2015 |
| JP | 2016-10810 | A | 1/2016 |
| JP | 2017-121649 | A | 7/2017 |
| JP | 2018-1234 | A | 1/2018 |
| JP | 2018-58078 | A | 4/2018 |
| JP | 2015-229169 | A | 12/2018 |
| JP | 2019-177411 | A | 10/2019 |
| JP | 2020-62675 | A | 4/2020 |
| JP | 2021-7977 | A | 1/2021 |
| KR | 1998-057552 | A | 9/1998 |
| KR | 20-0300236 | Y1 | 1/2003 |
| WO | WO-2020/110786 | A1 | 6/2020 |

OTHER PUBLICATIONS

Third Party's Submission issued Jan. 24, 2023 in Japanese Patent Application No. 2020-106327 (with partial English translation), 2 pages.

Kyoichi Umetsu, "Automation of Welding Work on Steel Frame Site in Building Construction and Issues Thereof", Japan Construction Machinery and Construction Association, vol. 71, No. 4, Apr. 30, 2019, pp. 24-31, (with partial English translation).

Japanese Information Offer issued Aug. 1, 2025 in Japanese Patent Application No. 2023-172953 (with partial English translation), 4 pages.

Japanese Information Offer issued Aug. 1, 2025 in Japanese Patent Application No. 2023-172954 (with partial English translation), 8 pages.

Japanese Information Offer issued Jun. 11, 2026 in Japaness Patent Application No. 2023-172855 (with partial English translation), 19 pages.

Japanese Information Offer on Dec. 9, 2024, in corresponding Japanese Patent Application No. 2020-106327 (with English Translation), 17 pages.

Japanese Information Offer issued May 9. 2025 in Japanese Patent Application No. 2023-172955 (with Partial English translation), 9 pages.

Japanese Information Offer issued May 9, 2025 in Japanese Patent Application No. 2023-172954 (with Partial English translation), 8 pages.

Japanese Information Offer issued May 9, 2025 in Japanese Patent Application No. 2023-172953 (with Partial English translation), 8 pages.

Japanese Information Offer issued Apr. 17, 2024 in Japanese Patent Application No. 2020-106327 (with Partial English Translation), 5 pages.

Japanese Information Offer issued Apr. 17, 2024 in Japanese Patent Application No. 2023-172953 (with Partial English Translation), 7 pages.

Japanese Information Offer issued Apr. 17, 2024 in Japanese Patent Application No. 2023-172955 (with Partial English Translation), 7 pages.

Japanese Information Offer issued Apr. 23, 2024 in Japanese Patent Application No. 2023-172954 (with Partial English Translation), 10 pages.

Japanese Third Party's Submission issued on Feb. 20, 2023, in Japanese Patent Application No. 2020-106327 (with Partial English Translation), 50 pages.

Teruyoshi Sekino, "Applications of Sensor System in Arc Welding with a Robot", Journal of the Japan Welding Society, vol. 60, No. 1, pp. 74-80, 1991, (with Partial English Translation).

(56) References Cited

OTHER PUBLICATIONS

Third Party's Submission issued Nov. 4, 2022 in Japanese Patent Application No. 2020-106327 (with partial English translation), 2 pages.
Third Party's Submission issued Nov. 8, 2022 in Japanese Patent Application No. 2020-106327 (with partial English translation), 2 page.
Third Party's Submission issued Nov. 28, 2022 in Japanese Patent Application No. 2020-106327 (with partial English translation), 28 pages.
Third Party's Submission issued Dec. 7, 2022 in Japanese Patent Application No. 2020-106327 (with partial English translation), 3 pages.
Yasuyuki Yoshida, et al., "Development of Horizontal Welding Robot for Construction Site," Mitsubishi Heavy Industries Technical Review, vol. 32, No. 6, Nov. 1995, pp. 387-390.

* cited by examiner 50
600
610
601
GROOVE CONDITION CALCULATION UNIT
WELDING CONDITION CALCULATION UNIT
SPEED CONTROL UNIT
TORCH POSITION DETERMINATION UNIT
TORCH ANGLE CALCULATION UNIT
602
603
604
605
606
620
630
160
160
200
210
211
100
W0
420
300
510
500
410
430
400

100
420
150
120
Z
140
112
Y
113
110
114
116
160
R1
170
W0
210
211
132
130
134
200
10
X

CONTROL METHOD FOR PORTABLE WELDING ROBOT, WELDING CONTROL DEVICE, PORTABLE WELDING ROBOT, AND WELDING SYSTEM

TECHNICAL FIELD

The present invention relates to a control method for a portable welding robot that can perform welding automatically while moving on a guide rail, a welding control device, a portable welding robot, and a welding system.

BACKGROUND ART

In the related art, for a welding work in a factory for manufacturing a welded structure in building a ship, an iron frame, a bridge, or the like, automation has progressed and a large multi-axis welding robot is frequently used. On the other hand, in a site welding work to which a large multi-axis welding robot cannot be applied, automation has been advanced from manual welding such as semi-automatic welding to a welding method to which a lightweight and small-sized portable welding robot that can be carried by one worker is applied. The application of such a portable welding robot can improve the welding efficiency at a welding site where welding has been performed manually so far.

As a technique to which this portable welding robot is applied, there is, for example, Patent Literature 1. In Patent Literature 1, a guide rail using a corner unit including a straight line portion and a curved portion is attached to an outer periphery of a polygonal box column to be welded, with respect to the polygonal box column used in a construction site. Then, a welding robot is slidably provided on the guide rail. When a position of a center of curvature of a welded portion welded by the welding robot is different from a position of a center of curvature of a position where the welding robot is located at the time of welding the welded portion in the corner unit, a control unit of a control device controls a moving speed of the welding robot such that a length of the welded portion per unit time by the welding robot (hereinafter, also referred to as "bead length") is constant. Accordingly, box columns having various shapes are efficiently welded. The bead length per unit time by the welding robot is also called "travel speed".

CITATION LIST

Patent Literature

Patent Literature 1: JP2018-58078A

SUMMARY OF INVENTION

Technical Problem

As described above, in Patent Literature 1, the moving speed of the welding robot (hereinafter, also referred to as "robot speed") is controlled, and even when a corner portion of the workpiece and a curved portion of the guide rail (hereinafter, also referred to as "rail") are not on concentric circles, by changing the travel speed to match a welding amount, efficient welding is possible. However, in the technique in Patent Literature 1, only controlling the robot speed is considered, and the influence of a torch angle, which causes a problem when the corner portion of the workpiece and the curved portion of the rail are not on concentric circles, is not considered. That is, the following phenomena occur.

(1) When the robot is on the curved portion of the rail and a torch tip portion is on a parallel portion of the workpiece, the torch angle at the parallel portion of the workpiece is a push angle or a drag angle.

(2) When the robot is on the curved portion of the rail and a torch tip portion is on the corner portion of the workpiece, the torch angle at the corner portion of the workpiece is a push angle or a drag angle.

In a case where the torch angle is a push angle or a drag angle, the following problems may occur, for example.

(In Case of Push Angle)

Spatter is likely to occur forward, leading to deterioration in welding workability.

(In Case of Drag Angle)

A molten pool at the rear is pushed up, and as a result, a convex bead is generated near a boundary between the corner portion and the straight line portion on the workpiece, leading to a poor bead appearance.

As the curvature of the corner portion of the workpiece becomes smaller and the difference in curvature from the curvature of the rail becomes larger, the amount of change in torch angle becomes larger, and the bead appearance at the boundary between the straight line portion and the corner portion becomes worse.

Here, examples of the workpiece having different radii of curvature include a roll-formed polygonal box column (BCP) for building structure and a roll-formed polygonal box column (BCR) for building structure. Generally, with respect to a plate thickness t, the radius of curvature of the BCP is calculated as 3.5t, while the radius of curvature of the BCR is 2.5t. That is, in the BCP and the BCR having the same plate thickness, when the radius of curvature of the rail is constant, the difference between the radius of curvature of the workpiece and the rail is larger in the BCR. Therefore, the BCR has a feature that the amount of change in torch angle at the curved portion of the rail is larger than that of the workpiece, and the bead appearance defect at the boundary between the straight line portion and the corner portion is likely to occur.

The present invention has been made in view of the above problems, and an object thereof is to provide a portable welding robot control method, a welding control device, a portable welding robot, and a welding system that can ensure a good bead appearance even when a corner portion of a workpiece and a curved portion of a rail are not on concentric circles and a difference in curvature between the corner portion of the workpiece and the curved portion of the rail is large.

Solution to Problem

Therefore, the above object of the present invention is achieved by a configuration of the following (A) relating to a portable welding robot control method.

(A) A portable welding robot control method using a welding system including a portable welding robot that has a guide rail set with respect to a workpiece having a corner portion and that moves on the guide rail to perform arc welding to the workpiece, and a welding control device that controls the portable welding robot, the portable welding robot including a welding torch and a movable portion that moves the welding torch in a welding direction, the welding control device including a torch position determination unit that determines a torch position on the workpiece and a torch angle calculation unit that calculates a torch angle at the torch position, the portable welding robot control method including:

a step of determining the torch position on the workpiece by the torch position determination unit;

a step of calculating the torch angle at the torch position by the torch angle calculation unit; and a step of controlling the torch angle by the movable portion based on the calculated torch angle.

The above object of the present invention is achieved by a configuration of the following (B) relating to a welding control device.

(B) A welding control device configured to control a portable welding robot that has a guide rail set with respect to a workpiece having a corner portion and that moves on the guide rail to perform arc welding to the workpiece, the welding control device including:

a torch position determination unit that determines a torch position on the workpiece; and a torch angle calculation unit that calculates a torch angle at the torch position, wherein the torch position determination unit determines the torch position on the workpiece, the torch angle calculation unit calculates the torch angle at the torch position, and the torch angle is controlled based on the calculated torch angle.

The above object of the present invention is achieved by a configuration of the following (C) relating to a portable welding robot.

(C) A portable welding robot that has a guide rail set with respect to a workpiece having a corner portion, that moves on the guide rail to perform arc welding to the workpiece, and that is to be controlled by the welding control device as described above, the portable welding robot including:

a welding torch; and a movable portion that moves the welding torch in a welding direction, wherein the movable portion controls the torch angle based on the torch angle calculated by the torch angle calculation unit.

According to this configuration, an angle deviation of the torch angle at each welding position is corrected by the movable portion, and welding can be performed at a substantially constant torch angle.

The above object of the present invention is achieved by a configuration of the following (D) relating to a welding system.

(D) A welding system including:

a portable welding robot that has a guide rail set with respect to a workpiece having a corner portion and that moves on the guide rail to perform arc welding to the workpiece; and a welding control device that controls the portable welding robot, wherein the portable welding robot includes a welding torch and a movable portion that moves the welding torch in a welding direction, the welding control device includes a torch position determination unit that determines a torch position on the workpiece and a torch angle calculation unit that calculates a torch angle at the torch position, the torch position determination unit determines the torch position on the workpiece, the torch angle calculation unit calculates the torch angle at the torch position, and the movable portion controls the torch angle based on the calculated torch angle.

The above object of the present invention is achieved by a configuration of the following (E) relating to a portable welding robot control method.

(E) A portable welding robot control method using a welding system including a portable welding robot that has a guide rail set with respect to a polygonal box column and that moves on the guide rail to perform arc welding to the polygonal box column, and a welding control device that controls the portable welding robot, the portable welding robot including a welding torch and a movable portion that moves the welding torch in a welding direction, the welding control device including a torch position determination unit that determines a torch position on the polygonal box column and a torch angle calculation unit that calculates a torch angle at the torch position, the portable welding robot control method including:

a step of determining the torch position on the polygonal box column by the torch position determination unit;

a step of calculating the torch angle at the torch position by the torch angle calculation unit; and a step of controlling the torch angle by the movable portion based on the calculated torch angle.

Advantageous Effects of Invention

According to the portable welding robot control method of the present invention, the torch angle can be controlled according to the torch position information on the workpiece and the bead appearance at the corner portion of the workpiece and a boundary position between the corner portion and the straight line portion can be improved, even when the corner portion of the workpiece and the curved portion of the guide rail are not on concentric circles and the difference in curvature between the corner portion of the workpiece and the curved portion of the guide rail is large.

BRIEF DESCRIPTION OF DRAWINGS

FIG. 4 is viewed from directly above.

DESCRIPTION OF EMBODIMENTS

Hereinafter, a welding system according to an embodiment of the present invention will be described with reference to the drawings. The present embodiment is an example of a case where a portable welding robot is used, and the welding system of the present invention is not limited to a configuration in the present embodiment.

<Configuration of Welding System>

Figure 1:
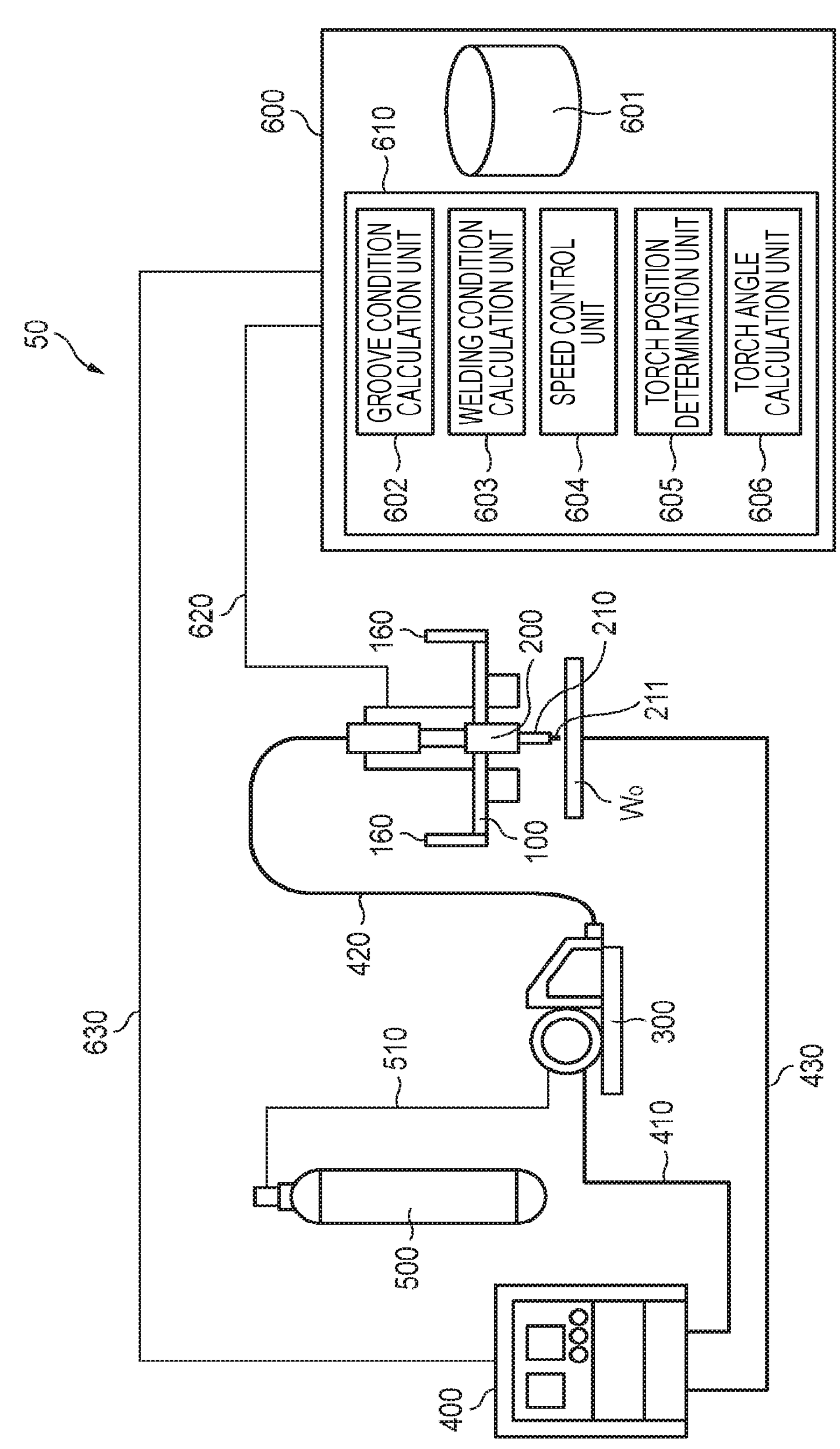
FIG. 1 is a schematic diagram of a welding system according to an embodiment of the present invention.

FIG. 1 is a schematic diagram illustrating a configuration of the welding system according to the present embodiment. As shown in FIG. 1, a welding system 50 includes a portable welding robot 100, a feeding device 300, a welding power supply 400, a shielding gas supply source 500, and a control device 600.

[Control Device]

The control device 600 is connected to the portable welding robot 100 via a robot control cable 620, and is connected to the welding power supply 400 via a power supply control cable 630.

The control device 600 includes a data storage unit 601 that stores teaching data for defining in advance workpiece information, guide rail information, position information of a workpiece $W_o$, position information of a guide rail 120, and an operation pattern, a welding start position, a welding end position, a welding condition, a weaving operation, etc., for the portable welding robot 100. Then, based on the teaching data, a command is sent to the portable welding robot 100 and the welding power supply 400 to control the operation and welding condition of the portable welding robot 100.

In addition, the control device 600 includes a groove condition calculation unit 602 that calculates groove shape information based on detection data obtained by sensing such as touch sensing or a visual sensor, and a welding condition calculation unit 603 that corrects the welding condition of the teaching data based on the groove shape information and acquires the welding condition. Further, the control device 600 includes a speed control unit 604 that controls a drive unit (not shown) for driving the portable welding robot 100 in an X direction, a Y direction, and a Z direction, which will be described later, a torch position determination unit 605 that determines a torch position, and a torch angle calculation unit 606 that controls a torch angle drive unit (movable arm portion 116) in the portable welding robot 100. Thus, a control unit 610 including the groove condition calculation unit 602, the welding condition calculation unit 603, the speed control unit 604, the torch position determination unit 605, and the torch angle calculation unit 606 is formed. The torch position determination unit 605 and the torch angle calculation unit 606 can be integrated into one.

Further, the control device 600 is integrally formed with a controller for teaching and a controller having other control functions. However, the control device 600 is not limited to this, and may be divided into a plurality of controllers depending on the role, for example, the controller for teaching and the controller having other control functions are separated from each other. Further, the control device 600 may be included in the portable welding robot 100, or as shown in FIG. 1, the control device 600 may be provided independently of the portable welding robot 100. That is, in the welding system including the portable welding robot 100 and the control device 600 described in the present embodiment, both a case where the control device 600 is included in the portable welding robot 100 and a case where the control device 600 is provided independently of the portable welding robot 100 are included. In addition, although a signal is transmitted using the robot control cable 620 and the power supply control cable 630 in the present embodiment, the present invention is not limited thereto, and the signal may be transmitted in a wireless manner. From the viewpoint of usability at a welding site, it is preferable that the control device 600 is divided into two controllers, one for teaching and the other having other control functions.

[Welding Power Supply]

Figure 2:
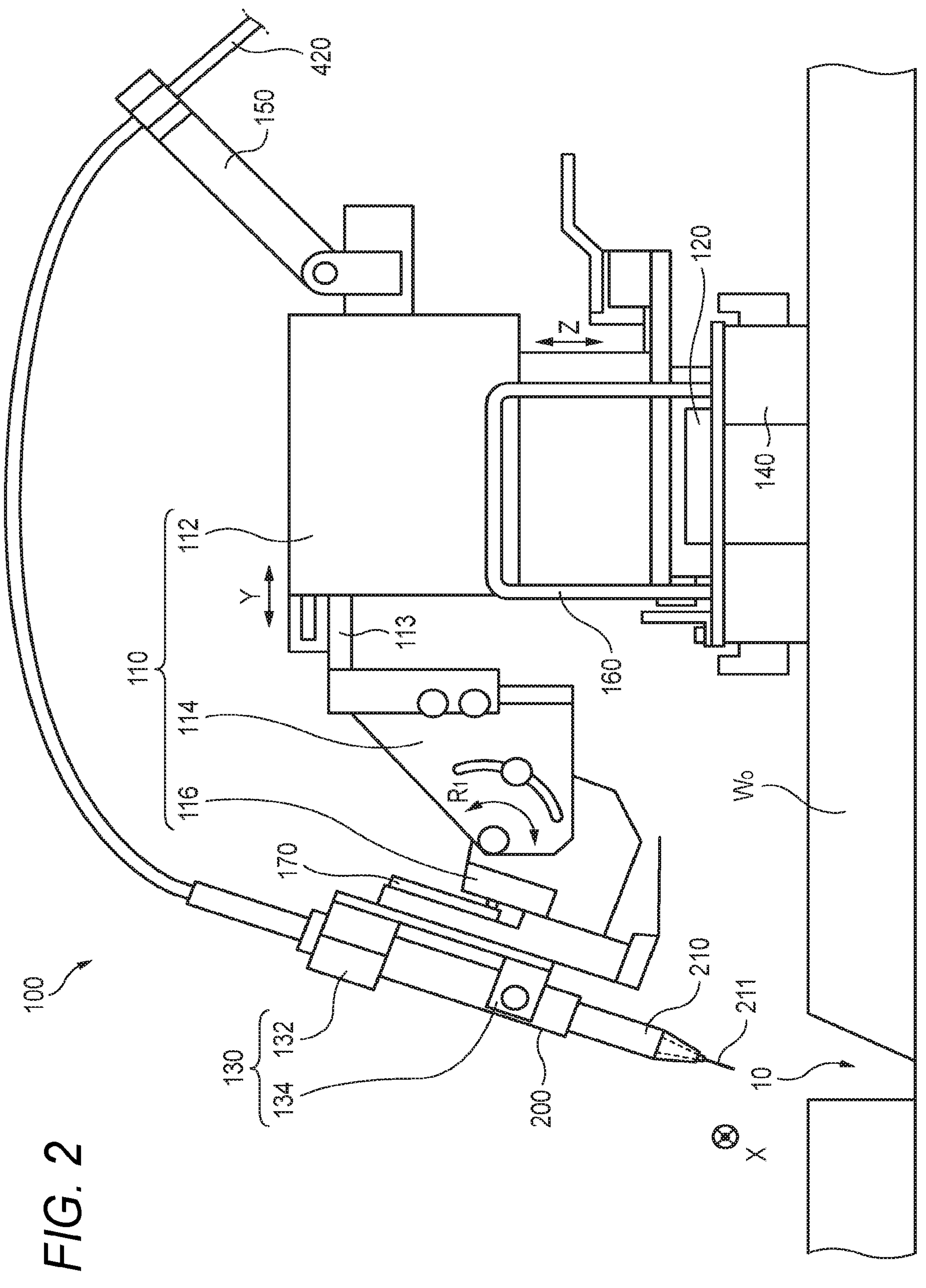
FIG. 2 is a schematic side view of a portable welding robot shown in FIG. 1.

The welding power supply 400 supplies power to a consumable electrode (hereinafter, also referred to as "welding wire") 211 and the workpiece $W_o$ in response to a command from the control device 600, thereby generating an arc between the welding wire 211 and the workpiece $W_o$. The power from the welding power supply 400 is sent to the feeding device 300 via a power cable 410, and is sent from the feeding device 300 to the welding torch 200 via a conduit tube 420. Then, as shown in FIG. 2, the power is supplied to the welding wire 211 via a contact tip at a tip of the welding torch 200. A current during the welding work may be a direct current or an alternating current, and a waveform thereof is not particularly limited. Therefore, the current may be a pulse of a rectangular wave, a triangular wave or the like.

In the welding power supply 400, for example, the power cable 410 is connected to a welding torch 200 side as a positive (+) electrode, and a power cable 430 is connected to the workpiece $W_o$ as a negative (−) electrode. This is a case of performing welding with reversed polarities, and in a case of performing welding with normal polarities, the welding power supply 400 may be connected to a workpiece $W_o$ side via a positive (+) power cable, and may be connected to the welding torch 200 side via a negative (−) power cable.

[Shielding Gas Supply Source]

The shielding gas supply source 500 includes a container in which a shielding gas is sealed and an additional member such as a valve. The shielding gas is sent from the shielding gas supply source 500 to the feeding device 300 via a gas tube 510. The shielding gas sent to the feeding device 300 is sent to the welding torch 200 via the conduit tube 420. The shielding gas sent to the welding torch 200 flows into the welding torch 200, is guided by a nozzle 210, and is ejected from the tip side of the welding torch 200. As the shielding gas used in the present embodiment, for example, argon (Ar), carbon dioxide ($CO_2$), or a mixed gas thereof can be used.

[Feeding Device]

The feeding device 300 feeds out the welding wire 211 and sends the welding wire 211 to the welding torch 200. The welding wire 211 fed by the feeding device 300 is not particularly limited, and is selected depending on properties, welding forms, and the like for the workpiece $W_o$. For example, a solid wire or a flux-cored wire (hereinafter also referred to as "FCW") is used. In addition, regardless of the material of the welding wire 211, for example, mild steel may be used, or materials such as stainless steel, aluminum, and titanium may be used. Further, the wire diameter of the welding wire 211 is not particularly limited, and a preferred wire diameter in the present embodiment is 1.6 mm as an upper limit and 0.9 mm as a lower limit.

With respect to the conduit tube 420 according to the present embodiment, a conductive path functioning as a power cable is formed on an outer skin side of the tube, and inside the tube, a protective tube for protecting the welding wire 211 is provided and a flow path for the shielding gas is formed. However, the conduit tube 420 is not limited thereto. For example, a tube in which a power supply cable and a shielding gas supply hose are bound around a protective tube for feeding the welding wire 211 to the welding torch 200 can be used. In addition, for example, tubes for feeding the welding wire 211 and the shielding gas may be provided separately from a power cable.

[Portable Welding Robot]

Figure 3:
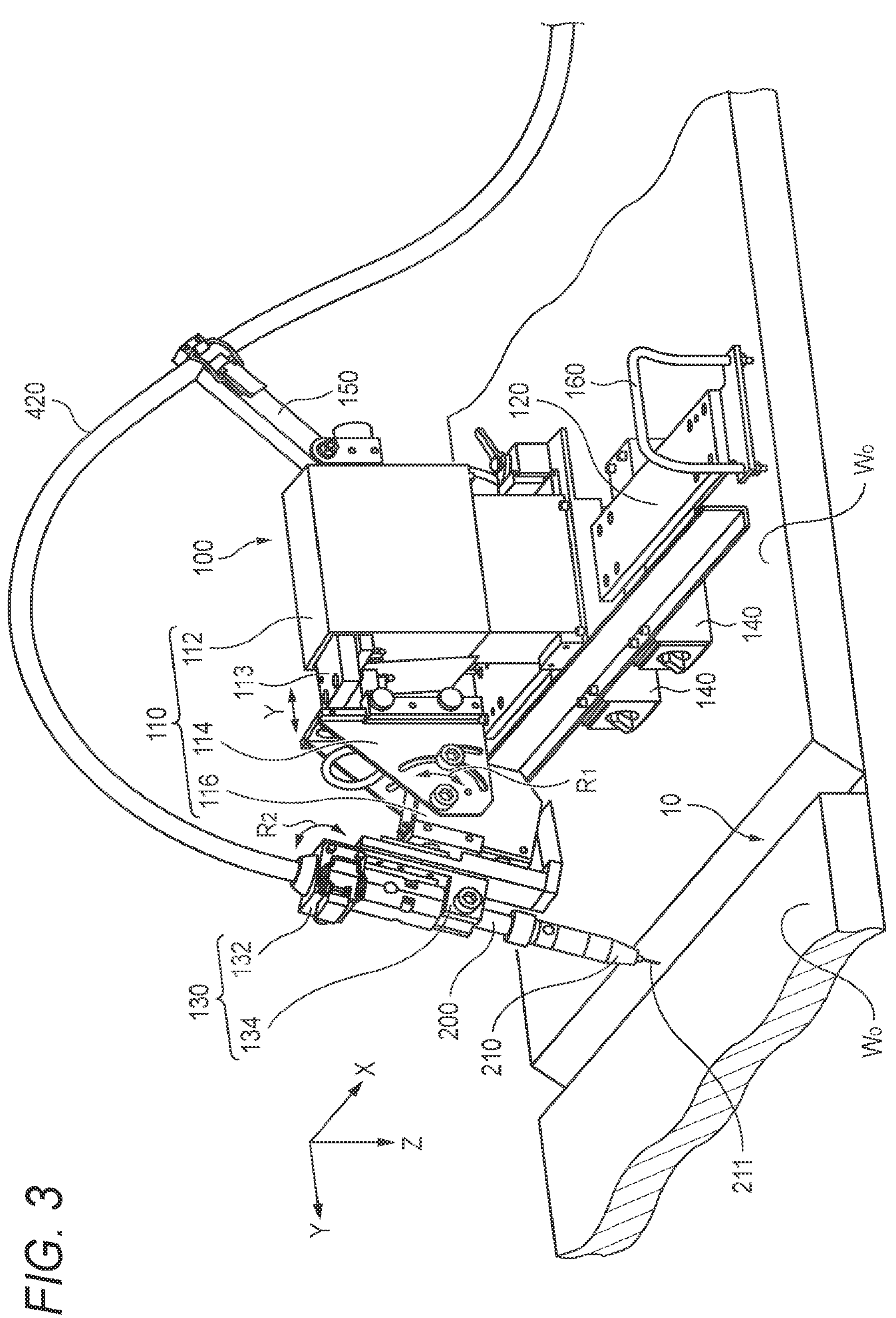
FIG. 3 is a perspective view of the portable welding robot shown in FIG. 2.

As shown in FIG. 2 and FIG. 3, the portable welding robot 100 includes the guide rail 120, a robot body 110 set on the guide rail 120 and moving along the guide rail 120, and a torch connection portion 130 that is mounted on the robot body 110. The robot body 110 mainly includes a main housing portion 112 set on the guide rail 120, a fixed arm portion 114 attached to the housing portion 112, and a movable arm portion 116 attached to the fixed arm portion 114 in a state of being rotatable in a direction indicated by an arrow $R_1$.

The torch connection portion 130 is attached to the movable arm portion 116 via a crank 170, which is a movable portion for moving the welding torch 200 in a welding direction, that is, in the X direction. The torch connection portion 130 includes a torch clamp 132 and a torch clamp 134 for fixing the welding torch 200. In addition, on a side opposite to a side where the welding torch 200 is attached, the housing portion 112 is provided with a cable clamp 150 for supporting the conduit tube 420 that connects the feeding device 300 and the welding torch 200.

In the present embodiment, a touch sensor is used as a detection unit that applies a voltage between the workpiece $W_o$ and the welding wire 211, and that uses a voltage drop phenomenon, which occurs when the welding wire 211 comes into contact with the workpiece $W_o$, to sense a surface or the like of a groove 10 on the workpiece $W_o$. The detection unit is not limited to the touch sensor in the present embodiment, and an image sensor, i.e., visual sensing, or a laser sensor, i.e., laser sensing, or a combination of these detection units may be used. The touch sensor in the present embodiment is preferably used in terms of simplicity of device configuration.

The housing portion 112 of the robot body 110 includes a robot drive unit (not shown) for driving the robot body 110 in a direction perpendicular to the paper surface as indicated by an arrow X in FIG. 2, i.e., in the X direction in which the robot body 110 moves along the guide rail 120. In addition, the housing portion 112 can be driven in the Z direction to move in a depth direction of the groove 10, which is perpendicular to the X direction. Further, the fixed arm portion 114 can be driven with respect to the housing portion 112 in the Y direction, which is a width direction of the groove 10 and is perpendicular to the X direction, via a slide support portion 113.

Further, the torch connection portion 130 to which the welding torch 200 is attached can be driven to swing in a front-back direction in the X direction, i.e., the welding direction, by rotating the crank 170 as indicated by an arrow $R_2$ in FIG. 3. Further, the movable arm portion 116 is attached to the fixed arm portion 114 so as to be rotatable as indicated by the arrow $R_1$, and can be adjusted to an optimum angle and fixed.

As described above, the robot body 110 can drive the welding torch 200, which is a tip portion, at three degrees of freedom. However, the robot body 110 is not limited thereto, and may be driven at any number of degrees of freedom depending on the application.

With the above configuration, a tip portion of the welding torch 200 attached to the torch connection portion 130 can be directed in any direction. Further, the robot body 110 can be driven on the guide rail 120 in the X direction in FIG. 2. The welding torch 200 reciprocates in the Y direction while the robot body 110 moves in the X direction, whereby weaving welding can be performed. In addition, the welding torch 200 can be tilted according to, for example, a construction state such as a push angle or a drag angle by driving with the crank 170. Further, when the welding torch 200 is tilted in the X direction by driving with the crank 170, it is possible to correct a push angle or a drag angle, i.e., a change in torch angle that occurs when curvatures of a corner portion WC of the workpiece $W_o$ and a curved portion 122 of the guide rail 120 are different from each other in a polygonal box column, which will be described later.

An attachment member 140 such as a magnet is provided below the guide rail 120, and the guide rail 120 is configured to be easily attached to and detached from the workpiece $W_o$ by the attachment member 140. When setting the portable welding robot 100 on the workpiece $W_o$, an operator can easily set the portable welding robot 100 on the workpiece $W_o$ by grasping both handles 160 of the portable welding robot 100.

<Torch Angle Control Method>

Figure 4:
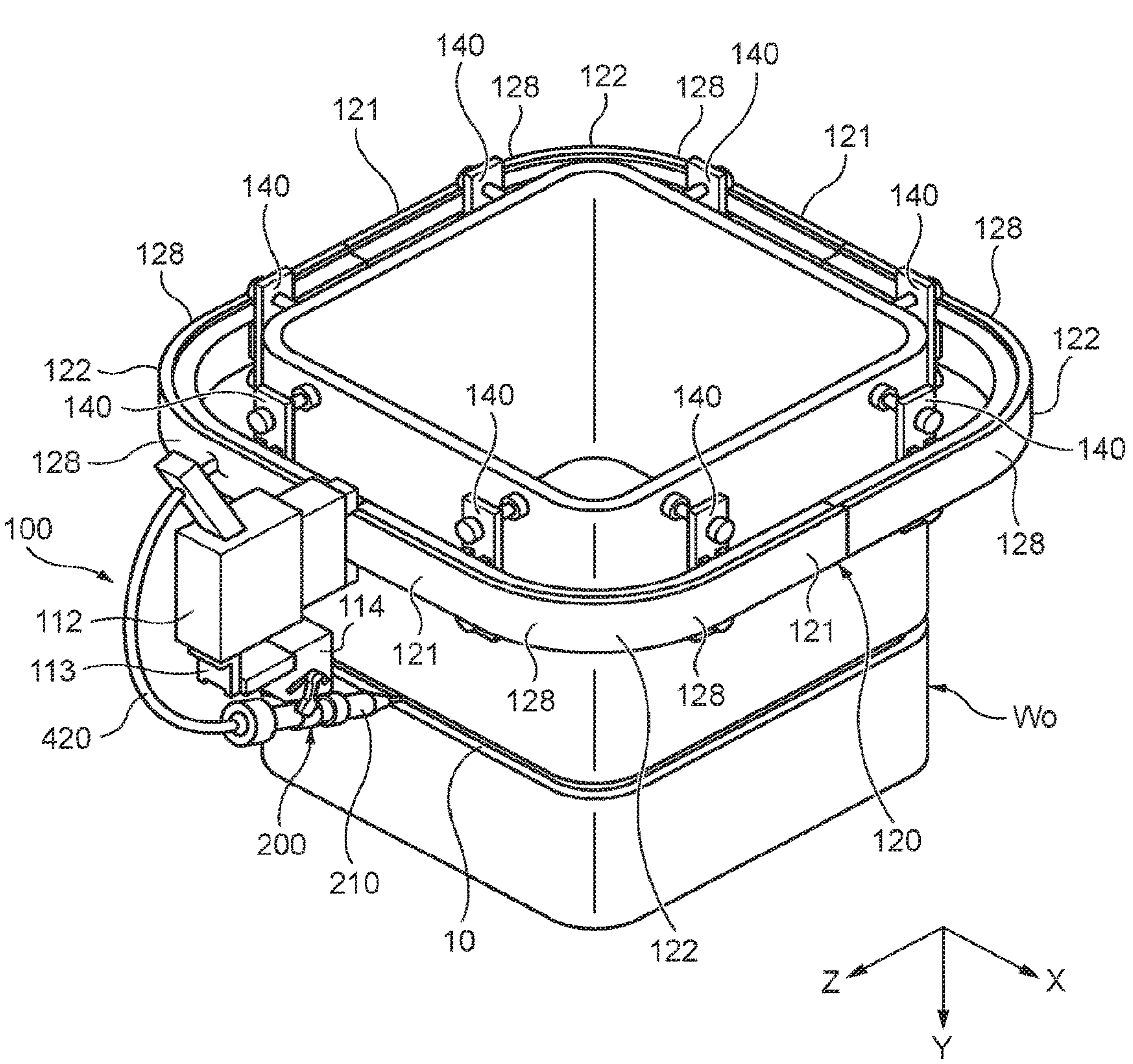
FIG. 4 is a perspective view showing a case where the welding robot shown in FIG. 3 is attached to a polygonal box column.

Next, a specific example of a torch angle control method when welding a polygonal box column by a portable welding robot traveling on a guide rail will be described. FIG. 4 is a perspective view showing a case where the portable welding robot 100 shown in FIG. 3 is attached to a polygonal box column. As shown in FIG. 4, the guide rail 120 is attached to the polygonal box column, which is the workpiece $W_o$, with an outer surface of the polygonal box column along a periphery direction. In this case, the guide rail 120 is provided so as to go around the outer surface of the polygonal box column via attachment members 140, and has a shape having straight line portions 121 and curved portions 122. In addition, the portable welding robot 100 is mounted, with the welding torch 200 directed downward, on the guide rail 120.

Figure 5:
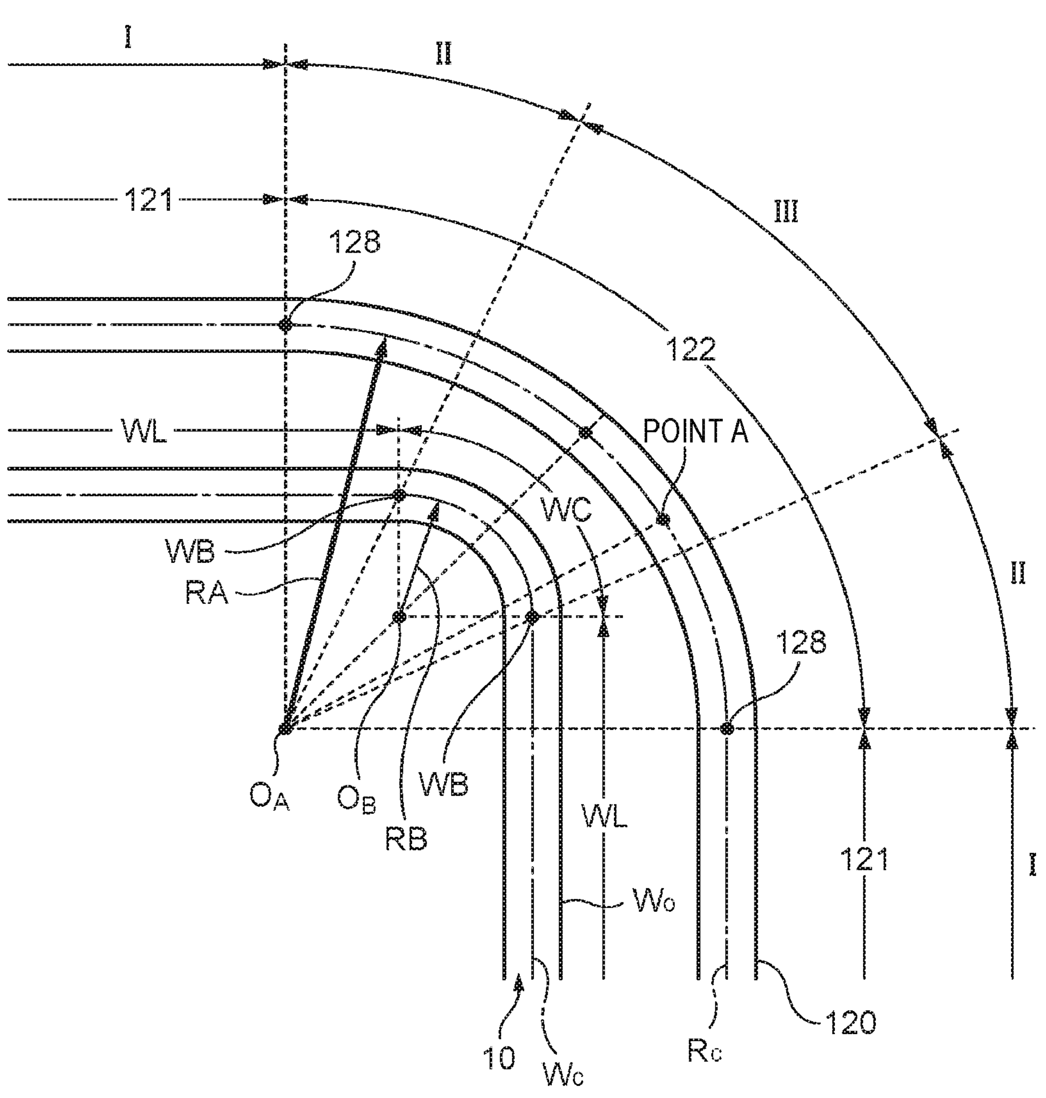
FIG. 5 is a diagram illustrating a positional relationship with a guide rail in a region of ¼ corner portion in a polygonal box column when

FIG. 5 is a diagram illustrating a positional relationship with the guide rail 120 in a region of ¼ corner portion in the polygonal box column $W_o$ when FIG. 4 is viewed from directly above.

The guide rail 120 shown in FIG. 4 and FIG. 5 includes the straight line portion 121, the curved portion 122, and a boundary point 128 between the straight line portion 121 and the curved portion 122 at which a guide route changes. In addition, the polygonal box column $W_o$ includes a straight line portion WL, a corner portion (curved portion) WC, and a boundary point WB between the straight line portion WL and the corner portion WC.

In this specific example, a radius of curvature RA of the curved portion 122 in the guide rail 120 is larger than a radius of curvature RB of the corner portion WC in the polygonal box column $W_o$, and the corner portion WC of the polygonal box column $W_o$ and the curved portion 122 of the guide rail 120 are not on concentric circles. The radius of curvature RA of the curved portion 122 in the guide rail 120 and the radius of curvature RB of the corner portion WC in the polygonal box column $W_o$ are each different in an outer periphery and an inner periphery. However, since it is sufficient that the total welding amount is the same, in this specific example, the average value of the outer periphery and the inner periphery is used.

As shown in FIG. 5, the radius of curvature RA of the curved portion 122 in the guide rail 120 is a distance between a center of curvature $O_A$ of the curved portion 122 and a rail center $R_c$ of the guide rail 120, and the radius of curvature RB of the corner portion WC in the polygonal box column $W_o$ is a distance between a center of curvature $O_B$ of the corner portion WC and a plate thickness center $W_c$ of the polygonal box column $W_o$.

The radius of curvature RA of the curved portion 122 in the guide rail 120 and the radius of curvature RB of the corner portion WC in the polygonal box column $W_o$ are different from each other (RA>RB in this specific example), and are not on concentric circles. Therefore, a welding region on the polygonal box column $W_o$ is divided into a first region I where the portable welding robot 100 is located at the straight line portion 121 of the guide rail 120 and the welding torch 200 is located at the straight line portion WL of the polygonal box column $W_o$, a second region II where the portable welding robot 100 is located at the curved portion 122 of the guide rail 120 and the welding torch 200 is located at the straight line portion WL of the polygonal box column $W_o$, and a third region II where the portable welding robot 100 is located at the curved portion 122 of the guide rail 120 and the welding torch 200 is located at the corner portion WC of the polygonal box column $W_o$.

The portable welding robot 100 welds the polygonal box column $W_o$ while traveling along the guide rail 120 based on an operation signal of the control device 600. The guide rail 120 includes the straight line portions 121, the curved portions 122, and the boundary points 128. In order to maintain a substantially constant welding quality over the entire length of the welded portion, it is preferable that a torch angle of the welding torch 200 is substantially constant regardless of the position of the portable welding robot 100 on the guide rail 120. Examples of the position on the guide rail 120 include the straight line portion 121, the curved portion 122, and the boundary point 128. The torch angle in the first region I is perpendicular to the polygonal box column $W_o$, and in the second region II and the third region III, the welding torch 200 may not perpendicular to the polygonal box column $W_o$. The torch angle is preferably controlled to a substantially constant torch angle with the torch angle in the straight line portion WL of the polygonal box column $W_o$ in the first region I as a reference.

Here, the expression “the torch angle is substantially constant” means that an angle error that is within a practically controllable angle range and that hardly influences the welding quality is allowed. Specifically, the angle error in the present embodiment is preferably within ±10°, more preferably within ±5°, and most preferably substantially 0°.

Specifically, in FIG. 5, when the portable welding robot 100 moves counterclockwise from a lower right to an upper side in the figure on the straight line portion 121 of the guide rail 120 in a state where the welding torch 200 is at a right angle with respect to the straight line portion WL of the polygonal box column $W_o$, i.e., the torch angle is 0°, the portable welding robot 100 reaches the curved portion 122 of the guide rail 120 and exits from the first region I earlier than the welding torch 200 reaches the corner portion WC of the polygonal box column $W_o$.

That is, despite that the welding torch 200 of the portable welding robot 100 is located at the straight line portion WL of the polygonal box column $W_o$, the robot body 110 enters the second region II located at the curved portion 122 of the guide rail 120. Thereby, the torch angle changes as the welding torch 200 tilts and the torch angle becomes a more push angle or a more drag angle. Since changes in torch angle may influence the welding quality, it is necessary to control the torch angle to be substantially constant.

Therefore, the torch position determination unit 605 of the control device 600 determines a torch position based on torch position information (torch position determination step), and calculates a torch angle correction amount $\theta_T$, which is a deviation amount of the torch angle, based on information such as sizes and shapes of the guide rail 120 and the polygonal box column $W_o$ input in advance to the control device 600 (torch angle calculation step). Then, the calculated deviation amount of the torch angle is input to the control device 600 as a correction value for the torch angle, and the crank 170, which is a movable portion, rotates as shown by the arrow $R_2$ in FIG. 3 to correct the deviation amount of the torch angle (torch angle control step).

In order to determine the torch position, the position information input to the torch position determination unit 605 may be acquired by a method of making the control device 600 recognize the size of the polygonal box column $W_o$ using a sensing function such as a laser sensor, and manually inputting the rail size to the control device 600, or a teaching point position stored in advance in the data storage unit 601 may be acquired as the position information.

The actual relative position of the polygonal box column $W_o$ and the guide rail 120 at a work site may have a deviation due to a production error of the polygonal box column $W_o$ and the guide rail 120, and an attachment error of the guide rail 120 to the polygonal box column $W_o$. Therefore, it is preferable that the torch position determination unit 605 makes a determination in consideration of this deviation. It is preferable that the position information of the workpiece $W_o$ and the position information of the guide rail 120 are acquired by the sensing function since the influence of the deviation can be eliminated. The sensing function is not particularly limited, and it is preferable to determine the torch position by using at least one sensing method among touch sensing, laser sensing, and visual sensing, or by combining these sensing methods.

The torch angle calculation unit 606 calculates the torch angle based on workpiece information, guide rail information, the position information of the workpiece $W_o$, and the position information of the guide rail 120. These pieces of information may be information acquired by sensing or the like, or may be numerical data of each piece of information stored in advance in the data storage unit 601.

<Torch Angle Calculation Method>

Next, a torch angle calculation method will be described in detail with reference to FIG. 5 to FIG. 8.

Here, an example in which, for example, a guide rail 120 having RA=261 mm is adopted as the guide rail 120 and a polygonal box column BCR is adopted as the polygonal box column $W_o$ will be described. There are BCR and BCP as the polygonal box column $W_o$, but in any of the polygonal box columns $W_o$, the radius of curvature with respect to the plate thickness is determined according to the speciation.

Figure 6:
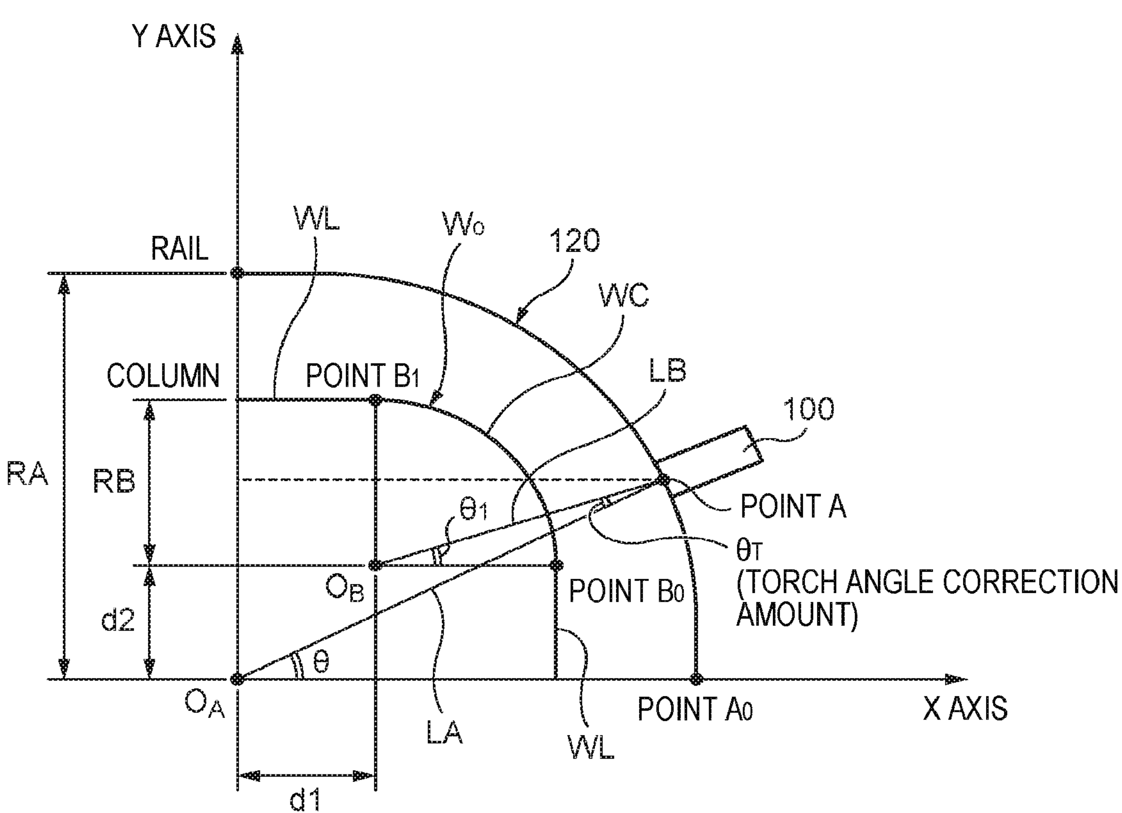
FIG. 6 is a diagram corresponding to FIG. 5.

FIG. 6 is a diagram showing a region of ¼ corner portion in the guide rail 120 (rail) and the polygonal box column $W_o$ (column), showing a center line $R_c$ of the guide rail 120 and a center line $W_c$ of the polygonal box column $W_o$. As shown in FIG. 6, the center of curvature of the quadrant of the guide rail 120 is $O_A$, the radius of curvature is RA, the center of curvature of the quadrant of the corner portion of the polygonal box column $W_o$ is $O_B$, the radius of curvature is RB, an X coordinate of the center of curvature $O_B$ is d1, and a Y coordinate of the center of curvature $O_B$ is d2. In addition, the portable welding robot 100 is located at a point A on the guide rail 120, an angle formed by the X axis and a line segment LA connecting the center of curvature $O_A$ and the point A is represented by $\theta$, and an angle formed by the X axis and a line segment LB connecting the center of curvature $O_B$ and the point A is represented by $\theta_1$. The second quadrant and the fourth quadrant (not shown in FIG. 6) in which the straight line portion 121 of the guide rail 120 and the straight line portion WL of the polygonal box column $W_o$ are parallel straight line portions as shown in FIG. 5 are outside the scope of this description since the torch angle is 0° and does not change.

Assuming that the portable welding robot 100 moves counterclockwise from a point $A_0$ on the X axis corresponding to the boundary point 128 in FIG. 5, in a section until the line segment LA passes through a boundary point $B_0$ between the straight line portion WL and the corner portion WC of the polygonal box column $W_o$, i.e., in the second region IT, the torch angle correction amount $\theta_T=\theta$ due to the relationship with the alternate angle; in the third region III where the line segment LA is between the point $B_0$ and a point $B_1$, the torch angle correction amount $\theta_T=\theta-\theta_1$; and in a section after the line segment LA passes through the boundary point $B_1$ between the corner portion WC and the straight line portion WL until coincides with the Y axis, i.e., in the second region II, the torch angle correction amount $\theta_T=90°-\theta$.

Since the torch angle correction amount $\theta_T$ in the second region II can be easily obtained if θ is known as the angle formed by the line segment LA and the X axis, the torch angle correction amount $\theta_T$ in the third region III where the line segment LA is between the point $B_0$ and the point $B_1$, that is, $0\leq\theta_1<90°$ will be described below in detail.

In the third region III, since the torch angle correction amount $\theta_T=\theta-\theta_1$, $\tan\theta_T=\tan(\theta-\theta_1)=(\tan\theta-\tan\theta_1)/(1+\tan\theta\times\tan\theta_1)$. Therefore, the equation (1) is obtained.

$$\theta_T=\tan^{-1}(\tan\theta-\tan\theta_1)/(1+\tan\theta\times\tan\theta_1) \qquad (1)$$

Here, since the XY coordinates of the point A are (RA cos θ, RA sin θ), the equation (2) is obtained.

$$\tan\theta_1=(RA\sin\theta-d2)/(RA\cos\theta-d1) \qquad (2)$$

When the equation (2) is substituted into the equation (1), the equation (3) is obtained.

$$\theta_T=\tan^{-1}(\tan\theta-((RA\sin\theta-d2)/(RA\cos\theta-d1))/(1+\tan\theta\times((RA\sin\theta-d2)/(RA\cos\theta-d1))) \qquad (3)$$

The equation (3) is established only in the range of $0\leq\theta_1<90°$.

Figure 7:
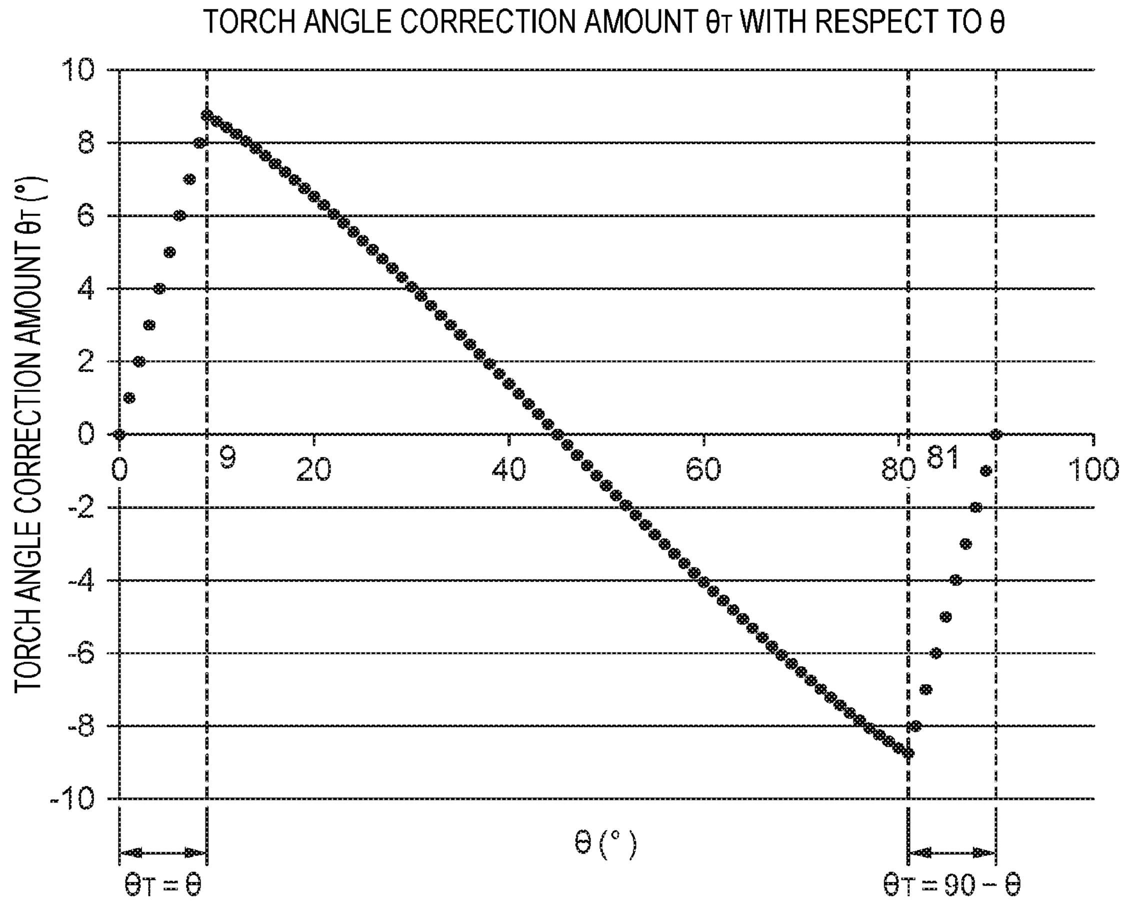
FIG. 7 is a graph showing a relationship between an angle θ of a straight line connecting a center of curvature of the guide rail and the portable welding robot on the guide rail, and a torch angle correction amount $\theta_T$.

Here, when the radius RA of the guide rail 120 is RA=261 mm and the radius of the corner portion WC of the polygonal box column Wo is RB=62.5 mm, d1=40 mm, and d2=40 mm are substituted into the equation (3) for calculation, the relationship between the angle θ and the torch angle correction amount $\theta_T$ is obtained as shown in FIG. 7.

Figure 8:
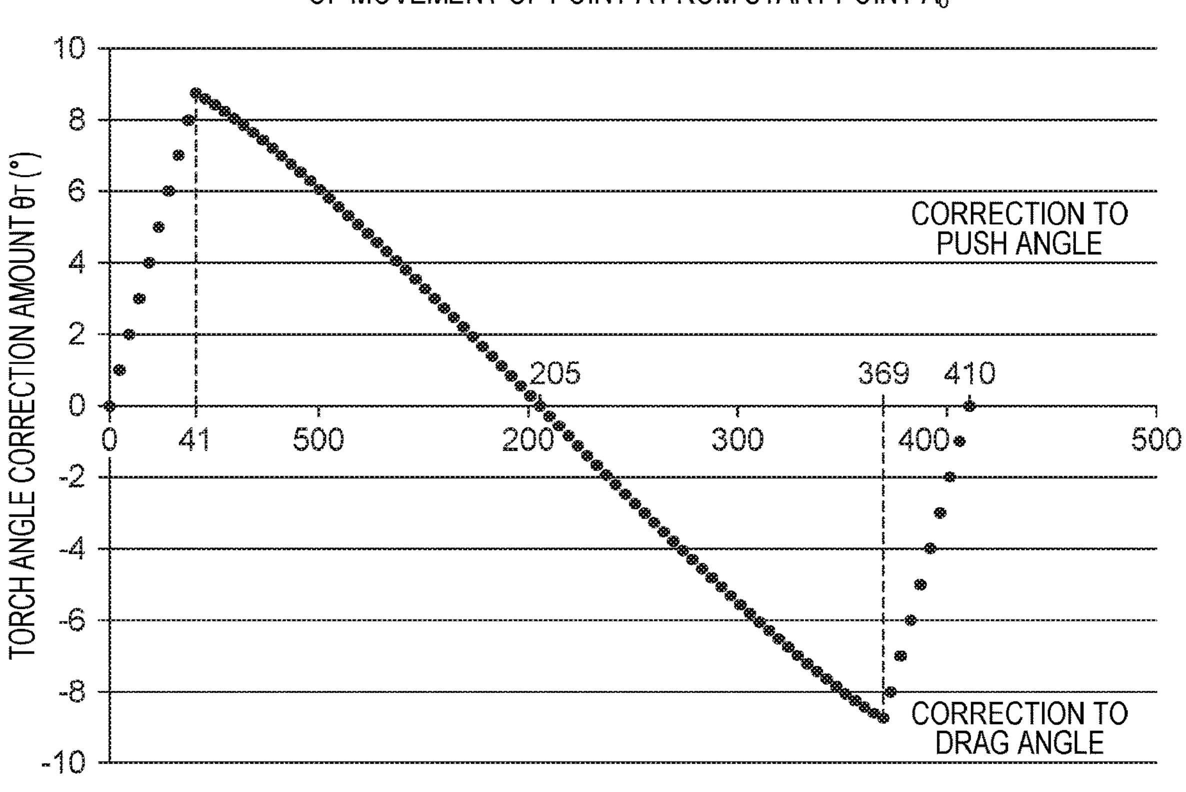
FIG. 8 is a graph showing a relationship between a moving distance D of the portable welding robot and the torch angle correction amount $\theta_T$.

Further, since the relationship "D=θ(rad)×RA" is established between the angle θ formed by the line segment LA and the X axis and a moving distance D from the point $A_0$ on the guide rail 120 of the portable welding robot 100, the angle θ formed by the line segment LA and the X axis can be converted into the moving distance D (mm) from the point $A_0$, and the relationship between the moving distance D (mm) and the torch angle correction amount $\theta_T$ is shown in FIG. 8.

Therefore, as shown in FIG. 7 and FIG. 8, in the range of $0°\leq\theta<45°$ and 0 mm≤D<205 mm, the torch angle is corrected to the push angle side by the torch angle correction amount $\theta_T$, and in the range of $45°\leq\theta<90°$ and 205 mm≤D<410 mm, the torch angle is corrected to the drag angle side by the torch angle correction amount $\theta_T$, whereby the torch angle is maintained at a constant angle. The position of θ=9°, that is, D=41 mm, and the position of θ=81°, that is, D=369 mm correspond to the boundary point WB between the straight line portion WL and the corner portion WC shown in FIG. 5.

Accordingly, even when the corner portion WC of the workpiece $W_o$ and the curved portion 122 of the guide rail 120 are not on concentric circles, and the difference in curvature between the corner portion WC of the workpiece $W_o$ and the curved portion 122 of the guide rail 120 is large, it is possible to weld at a substantially constant torch angle over the entire periphery of the welded portion, and a good bead appearance can be ensured.

(Other Welding Conditions)

In order to maintain a substantially constant welding quality over the entire length of the welded portion, it is preferable that other welding conditions including the above torch angle are also substantially constant.

As for other welding conditions, the portable welding robot 100 can also acquire the welding conditions at the time of welding using the robot body 110 that moves along the guide rail 120 before the start of welding the polygonal box column $W_o$. That is, the robot body 110 is driven based on the operation signal of the control device 600, automatic sensing of a groove shape is performed by the touch sensor, the groove condition calculation unit 602 calculates groove shape information, and the welding condition calculation unit 603 calculates the welding condition based on the groove shape information and the teaching data in the data storage unit 601.

Examples of the groove shape information include the groove shape, the plate thickness, a start part and an end part, and examples of the welding condition include a welding current, an arc voltage, a tip-base metal distance, and a travel speed. Welding may be performed based on the teaching data of the welding condition set in advance for each teaching point position on the guide rail without performing automatic sensing of the groove shape.

In addition, the torch position information can be acquired from the teaching point position on the guide rail stored in advance in the data storage unit 601. Examples of the torch position information include a straight line portion, a curved portion, and a boundary point of the guide rail, and a torch angle. These pieces of information may be acquired by a detection unit such as an image sensor or a laser sensor, or a combination of these detection units.

For example, in order to make the welding amount substantially constant over the entire length of the welded portion, a robot speed of the portable welding robot 100 calculated by the welding condition calculation unit 603 is controlled such that the robot speed at the curved portion 122 is faster than the robot speed at the straight line portion 121 of the guide rail 120. Basically, the robot speed may be changed with reference to teaching points, and the speed between the teaching points may be changed, for example, in a curved line, a straight line shape, or a stepped shape. The robot speed of the portable welding robot 100 specifically indicates a traveling speed of the portable welding robot 100 in the X direction on the guide rail 120.

That is, a robot speed $V_o$ at the curved portion 122 of the guide rail 120, which is the second region I and the third region III, is obtained as the product of a ratio RA/RB of the radius of curvature RA of the curved portion 122 of the guide rail 120 to the radius of curvature RB of the corner portion WC of the polygonal box column $W_o$, and a set robot speed $V_c$ set at the straight line portion 121, i.e., $V_o=V_c\times(RA/RB)$. The speed control unit 604 controls the robot speed of the portable welding robot 100 based on the robot speed calculated by the welding condition calculation unit 603.

In addition, in the second region II and the third region III, a heat input changes with respect to a heat input in the first region I of the polygonal box column $W_o$. Therefore, the welding condition is controlled such that the heat input in the second region II and the heat input in the third region III are each within ±20% of the heat input in the first region I. Accordingly, the heat input at the straight line portion WL and the corner portion WC in the polygonal box column $W_o$ is controlled to be substantially constant, and a substantially constant welding condition is maintained, so that joint appearances at the straight line portion WL and the corner portion WC of the polygonal box column $W_o$ have the same shape. The welding condition referred to here includes, for example, a robot speed, a welding current, a welding voltage, and a protrusion length, and are one or more conditions selected from these.

The present invention is not limited to the embodiments described above, and modifications, improvements, or the like can be made as appropriate.

Sensing using a touch sensor is performed in the above embodiment, but the sensing may be performed using a laser sensor or a visual sensor or a combination thereof.

In the above embodiment, the data used for setting the welding condition is automatically set by automatic sensing, but may be input to the control device 600 in advance by teaching or the like.

The shapes of the polygonal box column $W_o$ and the guide rail 120 may be converted from CAD data into the XY coordinate system, or may be converted into the XY coordinate system based on the sensing. In addition, shape information of the polygonal box column $W_o$ and the guide rail 120 may be input to the data storage unit 601 in advance and the shape information may be converted into the XY coordinate system.

In the above embodiment, the case where the radius of curvature RA of the curved portion 122 of the guide rail 120 is larger than the radius of curvature RB of the corner portion WC of the polygonal box column $W_o$, that is, RA>RB has been described. Alternatively, the present invention is similarly applied to a case where the radius of curvature RA of the curved portion 122 of the guide rail 120 is smaller than the radius of curvature RB of the corner portion WC of the polygonal box column $W_o$, that is, RA<RB.

As described above, the present description discloses the following matters.

(1) A portable welding robot control method using a welding system including a portable welding robot that has a guide rail set with respect to a workpiece having a corner portion and that moves on the guide rail to perform arc welding to the workpiece, and a welding control device that controls the portable welding robot, the portable welding robot including a welding torch and a movable portion that moves the welding torch in a welding direction, the welding control device including a torch position determination unit that determines a torch position on the workpiece and a torch angle calculation unit that calculates a torch angle at the torch position, the portable welding robot control method including:

- a step of determining the torch position on the workpiece by the torch position determination unit;
- a step of calculating the torch angle at the torch position by the torch angle calculation unit; and
- a step of controlling the torch angle by the movable portion based on the calculated torch angle.

According to this configuration, even when the corner portion of the workpiece and the curved portion of the guide rail are not on concentric circles, and a difference in curvature between the corner portion of the workpiece and the curved portion of the guide rail is large, the torch angle can be controlled to a substantially constant angle and a good bead appearance can be ensured.

(2) The portable welding robot control method according to (1), wherein the torch position determination unit determines the torch position by at least one sensing means of touch sensing, laser sensing, or visual sensing, or determines the torch position based on a predetermined teaching point position.

According to this configuration, the torch position can be automatically determined by a sensing function. In addition, the torch position can be determined based on the teaching data stored in the data storage unit.

(3) The portable welding robot control method according to (1) or (2), wherein the torch angle calculation unit calculates the torch angle based on workpiece information, guide rail information, and position information of the workpiece and the guide rail.

According to this configuration, a change in torch angle that occurs in the curved portion of the guide rail can be calculated, and by controlling the torch angle, the bead appearance at the straight line portion, the corner portion, and the boundary position between the corner portion and the straight line portion on the workpiece can be improved.

(4) The portable welding robot control method according to any one of (1) to (3), wherein

- the welding control device includes a welding condition calculation unit, and
- at the torch position, control of the torch angle is performed and control of a welding condition is performed.

According to this configuration, welding can be performed under optimum welding conditions according to each welding position.

(5) The portable welding robot control method according to (4), wherein the control of the welding condition is control of at least one of a welding current, an arc voltage, a tip-base metal distance, or a robot moving speed.

According to this configuration, welding can be performed by selecting optimum welding conditions according to each welding position.

(6) The portable welding robot control method according to any one of (1) to (5), wherein the movable portion controls the torch angle such that the torch angle at a straight line portion and the corner portion of the workpiece is substantially constant with reference to the torch angle at the straight line portion of the workpiece.

According to this configuration, even when the corner portion of the workpiece and the curved portion of the guide rail are not on concentric circles, and a difference in curvature between the corner portion of the workpiece and the curved portion of the guide rail is large, the torch angle can be maintained to be substantially constant and a good bead appearance can be ensured.

(7) The portable welding robot control method according to (3), wherein the torch angle calculation unit calculates the torch angle based on a radius of curvature at the corner portion of the workpiece and a radius of curvature at a curved portion of the guide rail at the torch position.

According to this configuration, a deviation angle of the torch angle at each welding position can be calculated accurately.

(8) The portable welding robot control method according to (4) or (5), wherein the control of the welding condition is performed such that a heat input at the corner portion and a heat input at a boundary region between the corner portion and a straight line portion of the workpiece are each within ±20% of a heat input at the straight line portion.

According to this configuration, even when the corner portion of the workpiece and the curved portion of the guide rail are not on concentric circles, and a difference in curvature between the corner portion of the workpiece and the curved portion of the guide rail is large, a good bead appearance can be ensured by controlling the heat input.

(9) A welding control device configured to control a portable welding robot that has a guide rail set with respect to a workpiece having a corner portion and that moves on the guide rail to perform arc welding to the workpiece, the welding control device including:

- a torch position determination unit that determines a torch position on the workpiece; and
- a torch angle calculation unit that calculates a torch angle at the torch position, wherein
- the torch position determination unit determines the torch position on the workpiece,
- the torch angle calculation unit calculates the torch angle at the torch position, and
- the torch angle is controlled based on the calculated torch angle.

According to this configuration, even in a region where the corner portion of the workpiece and the curved portion of the guide rail are not on concentric circles, and a difference in curvature between the corner portion of the workpiece and the curved portion of the guide rail is large, the torch angle can be maintained to be substantially constant and a good bead appearance can be ensured.

(10) A portable welding robot that has a guide rail set with respect to a workpiece having a corner portion, that moves on the guide rail to perform arc welding to the workpiece, and that is to be controlled by the welding control device according to (9), the portable welding robot including:

- a welding torch; and
- a movable portion that moves the welding torch in a welding direction, wherein
- the movable portion controls the torch angle based on the torch angle calculated by the torch angle calculation unit.

According to this configuration, an angle deviation of the torch angle at each welding position is corrected by the movable portion, and welding can be performed at a substantially constant torch angle.

(11) A welding system including:

- a portable welding robot that has a guide rail set with respect to a workpiece having a corner portion and that moves on the guide rail to perform are welding to the workpiece; and
- a welding control device that controls the portable welding robot, wherein
- the portable welding robot includes a welding torch and a movable portion that moves the welding torch in a welding direction,
- the welding control device includes a torch position determination unit that determines a torch position on the workpiece and a torch angle calculation unit that calculates a torch angle at the torch position,
- the torch position determination unit determines the torch position on the workpiece,
- the torch angle calculation unit calculates the torch angle at the torch position, and
- the movable portion controls the torch angle based on the calculated torch angle.

According to this configuration, an angle deviation of the torch angle at each welding position is calculated by the torch angle calculation unit, and the torch angle is controlled by the movable portion to correct the angle deviation, whereby welding can be performed at a substantially constant torch angle.

(12) A portable welding robot control method using a welding system including a portable welding robot that has a guide rail set with respect to a polygonal box column and that moves on the guide rail to perform arc welding to the polygonal box column, and a welding control device that controls the portable welding robot, the portable welding robot including a welding torch and a movable portion that moves the welding torch in a welding direction, the welding control device including a torch position determination unit that determines a torch position on the polygonal box column and a torch angle calculation unit that calculates a torch angle at the torch position, the portable welding robot control method including:

- a step of determining the torch position on the polygonal box column by the torch position determination unit;
- a step of calculating the torch angle at the torch position by the torch angle calculation unit; and
- a step of controlling the torch angle by the movable portion based on the calculated torch angle.

According to this configuration, with the portable welding robot set on the guide rail, the entire periphery of the welded portion of the polygonal box column can be welded at a substantially constant torch angle, and a good bead appearance can be ensured.

Although various embodiments have been described above with reference to the drawings, it is needless to say that the present invention is not limited to these examples. It will be apparent to those skilled in the art that various changes and modifications may be conceived within the scope of the claims. It is also understood that the various changes and modifications belong to the technical scope of the present invention. Constituent elements in the embodiments described above may be combined freely within a range not departing from the spirit of the present invention.

The present application is based a Japanese patent application (No. 2020-106327) filed on Jun. 19, 2020, contents of which are incorporated by reference in the present application.

REFERENCE SIGNS LIST

- 50 welding system
- 100 portable welding robot
- 120 guide rail
- 121 straight line portion (of guide rail)
- 122 curved portion (of guide rail)
- 128 boundary point (of guide rail)
- 170 crank (movable portion)
- 200 welding torch
- 300 feeding device
- 400 welding power supply
- 500 shielding gas supply source
- 600 control device (welding control device)
- 603 welding condition calculation unit
- 605 torch position determination unit
- 606 torch angle calculation unit
- d1 X coordinate of center of curvature $O_B$
- d2 Y coordinate of center of curvature $O_B$
- LA line segment connecting center of curvature $O_A$ and point A
- LB line segment connecting center of curvature $O_B$ and point A
- $O_A$ center of curvature of curved portion (of guide rail)
- $O_B$ center of curvature of corner portion (of workpiece)

RA radius of curvature in curved portion of guide rail

RB radius of curvature in corner portion of workpiece $W_o$ workpiece (polygonal box column)

WL straight line portion (of workpiece)

WC corner portion (curved portion) (of workpiece)

WB boundary point (of workpiece)

I first region

II second region

III third region $\theta$ angle formed by line segment LA and X axis $\theta_1$ angle formed by line segment LB and X axis $\theta_T$ torch angle correction amount

The invention claimed is:

1. A portable welding robot control method using a welding system including a portable welding robot that has a guide rail set with respect to a workpiece having a corner portion and that moves on the guide rail to perform arc welding to the workpiece, and a welding control device that controls the portable welding robot, the portable welding robot including a welding torch and a movable portion that moves the welding torch in a welding direction, the welding control device including a torch position determination unit that determines a torch position on the workpiece and a torch angle calculation unit that calculates a torch angle at the torch position, the portable welding robot control method comprising:

- determining the torch position on the workpiece by the torch position determination unit;
- calculating the torch angle at the torch position by the torch angle calculation unit; and
- controlling the torch angle by the movable portion based on the calculated torch angle,
- wherein the torch angle calculation unit calculates the torch angle based on workpiece information, guide rail information, and position information of the workpiece and the guide rail, including calculating the torch angle based on a radius of curvature at the corner portion of the workpiece and a radius of curvature at a curved portion of the guide rail at the torch position, and
- wherein the movable portion controls the torch angle such that the torch angle at a straight line portion and the corner portion of the workpiece is substantially constant with reference to the torch angle at the straight line portion of the workpiece.

2. The portable welding robot control method according to claim 1, wherein the torch position determination unit determines the torch position by at least one sensing means of touch sensing, laser sensing, or visual sensing, or determines the torch position based on a predetermined teaching point position.

3. The portable welding robot control method according to claim 1, wherein

- the welding control device includes a welding condition calculation unit, and
- at the torch position, control of the torch angle is performed and control of a welding condition is performed.

4. The portable welding robot control method according to claim 3, wherein the control of the welding condition is control of at least one of a welding current, an arc voltage, a tip-base metal distance, or a robot moving speed.

5. The portable welding robot control method according to claim 3, wherein the control of the welding condition is performed such that a heat input at the corner portion and a heat input at a boundary region between the corner portion and a straight line portion of the workpiece are each within ±20% of a heat input at the straight line portion.

6. A welding control device configured to control a portable welding robot that has a guide rail set with respect to a workpiece having a corner portion and that moves on the guide rail to perform arc welding to the workpiece, the portable welding robot including a welding torch and a movable portion that moves the welding torch in a welding direction, the welding control device comprising:

- a torch position determination unit that determines a torch position on the workpiece; and
- a torch angle calculation unit that calculates a torch angle at the torch position, wherein
- the torch position determination unit determines the torch position on the workpiece,
- the torch angle calculation unit calculates the torch angle at the torch position, and
- the torch angle is controlled based on the calculated torch angle,
- wherein the torch angle calculation unit calculates the torch angle based on workpiece information, guide rail information, and position information of the workpiece and the guide rail, including calculating the torch angle based on a radius of curvature at the corner portion of the workpiece and a radius of curvature at a curved portion of the guide rail at the torch position, and
- wherein the movable portion controls the torch angle such that the torch angle at a straight line portion and the corner portion of the workpiece is substantially constant with reference to the torch angle at the straight line portion of the workpiece.

7. A portable welding robot that has a guide rail set with respect to a workpiece having a corner portion, that moves on the guide rail to perform arc welding to the workpiece, and that is to be controlled by the welding control device according to claim 6, the portable welding robot comprising:

- a welding torch; and
- a movable portion that moves the welding torch in a welding direction, wherein
- the movable portion controls the torch angle based on the torch angle calculated by the torch angle calculation unit,
- wherein the torch angle calculation unit calculates the torch angle based on workpiece information, guide rail information, and position information of the workpiece and the guide rail, including calculating the torch angle based on a radius of curvature at the corner portion of the workpiece and a radius of curvature at a curved portion of the guide rail at the torch position, and
- wherein the movable portion controls the torch angle such that the torch angle at a straight line portion and the corner portion of the workpiece is substantially constant with reference to the torch angle at the straight line portion of the workpiece.

8. A welding system comprising:

- a portable welding robot that has a guide rail set with respect to a workpiece having a corner portion and that moves on the guide rail to perform arc welding to the workpiece; and
- the welding control device accordingly to claim 6, wherein
- the portable welding robot includes a welding torch and a movable portion that moves the welding torch in a welding direction, and
- the movable portion controls the torch angle based on the calculated torch angle.

9. A portable welding robot control method using a welding system including a portable welding robot that has a guide rail set with respect to a polygonal box column and that moves on the guide rail to perform arc welding to the polygonal box column, and a welding control device that controls the portable welding robot, the portable welding robot including a welding torch and a movable portion that moves the welding torch in a welding direction, the welding control device including a torch position determination unit that determines a torch position on the polygonal box column and a torch angle calculation unit that calculates a torch angle at the torch position, the portable welding robot control method comprising:

determining the torch position on the polygonal box column by the torch position determination unit;

calculating the torch angle at the torch position by the torch angle calculation unit; and controlling the torch angle by the movable portion based on the calculated torch angle, wherein the torch angle calculation unit calculates the torch angle based on workpiece information, guide rail information, and position information of the workpiece and the guide rail, including calculating the torch angle based on a radius of curvature at a corner portion of the workpiece and a radius of curvature at a curved portion of the guide rail at the torch position, and wherein the movable portion controls the torch angle such that the torch angle at a straight line portion and the corner portion of the workpiece is substantially constant with reference to the torch angle at the straight line portion of the workpiece.

10. The portable welding robot control method according to claim 2, wherein the welding control device includes a welding condition calculation unit, and at the torch position, control of the torch angle is performed and control of a welding condition is performed.

11. The portable welding robot control method according to claim 10, wherein the control of the welding condition is performed such that a heat input at the corner portion and a heat input at a boundary region between the corner portion and a straight line portion of the workpiece are each within ±20% of a heat input at the straight line portion.

* * * * *